United States Patent
Khan

(10) Patent No.: US 12,299,145 B1
(45) Date of Patent: May 13, 2025

(54) METHOD FOR AUTHENTICATING THE QURAN IN DIGITAL FORMAT AND CERTIFYING THE AUTHENTICITY OF THE DIGITAL QURAN

(71) Applicant: KING SAUD UNIVERSITY, Riyadh (SA)

(72) Inventor: Muhammad Khurram Khan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/902,822

(22) Filed: Sep. 30, 2024

(51) Int. Cl.
G06F 21/60 (2013.01)
G06F 21/64 (2013.01)

(52) U.S. Cl.
CPC .......... *G06F 21/602* (2013.01); *G06F 21/645* (2013.01)

(58) Field of Classification Search
CPC .............................. G06F 21/602; G06F 21/645
See application file for complete search history.

(56) References Cited

U.S. PATENT DOCUMENTS

| | | | |
|---|---|---|---|
| 5,912,974 A | 6/1999 | Holloway et al. | |
| 6,772,342 B1 | 8/2004 | Hawthorne | |
| 7,117,367 B2 | 10/2006 | Carro | |
| 7,302,476 B1 | 11/2007 | Greene et al. | |
| 7,809,700 B2 | 10/2010 | Lowrance et al. | |
| 10,572,654 B2 | 2/2020 | Zaver | |
| 2008/0097992 A1 | 4/2008 | Monro | |
| 2011/0143325 A1 | 6/2011 | Al-Khalaf et al. | |
| 2013/0269006 A1* | 10/2013 | Baron | H04L 63/08 726/4 |
| 2016/0307308 A1 | 10/2016 | Marafie | |
| 2023/0140404 A1* | 5/2023 | Tsyganko | G06F 16/168 707/687 |

OTHER PUBLICATIONS

Hakak, Saqib, et al. "A framework for authentication of digital Quran." Information Systems Design and Intelligent Applications: Proceedings of Fourth International Conference India 2017. Springer Singapore, 2018. (Year: 2018).*

(Continued)

*Primary Examiner* — Sangseok Park
(74) *Attorney, Agent, or Firm* — Nath, Goldberg & Meyer; Joshua B. Goldberg

(57) ABSTRACT

A method for authenticating a digital version of the Quran includes receiving a digital file containing a copy of the Quran therein, transmitting the received digital file to a first trusted party, reviewing, by the first trusted party, the copy of the Quran contained in the received digital file, determining, by the first trusted party, that the copy of the Quran contained in the received digital file is an authentic copy of the Quran, marking the received digital file containing the authentic copy of the Quran as an approved file, digitally signing the approved file by a second trusted party and issuing a digital certificate of authenticity for the approved file, and timestamping the digitally signed approved file, the digital certificate of authenticity for the approved file, and the security feature when the approved file contains text or images of the Quran.

13 Claims, 9 Drawing Sheets

(56) References Cited

OTHER PUBLICATIONS

Khan, Muhammad Khurram, Zeeshan Siddiqui, and Omar Tayan. "A secure framework for digital Quran certification." 2017 IEEE International Conference on Consumer Electronics (ICCE). IEEE, 2017. (Year: 2017).*

Almazrooie, Mishal, et al. "Integrity verification for digital Holy Quran verses using cryptographic hash function and compression." Journal of King Saud University—Computer and Information Sciences 32.1 (2020): 24-34. (Year: 2020).*

Kurniawan, Fajri, et al. "Exploiting digital watermarking to preserve integrity of the digital Holy Quran images." 2013 Taibah University International Conference on Advances in Information Technology for the Holy Quran and Its Sciences. IEEE, 2013. (Year: 2013).*

Khan, Muhammad Khurram, Zeeshan Siddiqui, and Omar Tayan. "A secure framework for digital Quran certification." 2017 IEEE International Conference on Consumer Electronics (ICCE). IEEE, 2017.

Kamsin, Amirrudin, et al. "Developing the novel Quran and Hadith authentication system." The 5th International Conference on Information and Communication Technology for The Muslim World (ICT4M). IEEE, 2014.

Hilmi, Mohd Faiz, et al. "Authentication of electronic version of the Holy Quran: an information security perspective." 2013 Taibah University International Conference on Advances in Information Technology for the Holy Quran and Its Sciences. IEEE, 2013.

Tayan, Omar, Muhammad N. Kabir, and Yasser M. Alginahi. "Framework and process for digital-quran integrity-verification using a browser plug-in." 2014 World Symposium on Computer Applications & Research (WSCAR). IEEE, 2014.

Hassan, Ammar M., et al. "A novel public key self-embedding fragile watermarking technique for image authentication." 2009 16th IEEE International Conference on Image Processing (ICIP). IEEE, 2009.

* cited by examiner

| C1 | C2 | C3 | C4 |
|---|---|---|---|
| 1 | 1 | 1 | بِسْمِ اللَّهِ الرَّحْمَنِ الرَّحِيمِ |
| 1 | 2 | 1 | الْحَمْدُ لِلَّهِ رَبِّ الْعَالَمِينَ |
| 1 | 3 | 1 | الرَّحْمَنِ الرَّحِيمِ |
| 1 | 4 | 1 | مَالِكِ يَوْمِ الدِّينِ |
| 1 | 5 | 1 | إِيَّاكَ نَعْبُدُ وَإِيَّاكَ نَسْتَعِينُ |
| 1 | 6 | 1 | اهْدِنَا الصِّرَاطَ الْمُسْتَقِيمَ |
| 1 | 7 | 1 | صِرَاطَ الَّذِينَ أَنْعَمْتَ عَلَيْهِمْ غَيْرِ الْمَغْضُوبِ عَلَيْهِمْ وَلَا الضَّالِّينَ |

| | بِسْمِ اللَّهِ الرَّحْمَٰنِ الرَّحِيمِ\|1\|1\|1 | — 601 |

| # | Unicode | Binary | Hexadecimal |
|---|---|---|---|
| 1 | 1 | 00000000 00110001 | 0031 |
| 2 | \| | 00000000 01111100 | 007C |
| 3 | 1 | 00000000 00110001 | 0031 |
| 4 | \| | 00000000 01111100 | 007C |
| 5 | 1 | 00000000 00110001 | 0031 |
| 6 | \| | 00000000 01111100 | 007C |
| 7 | ب | 00000110 00101000 | 0628 |
| 8 | ِ | 00000110 01010000 | 0650 |
| 9 | س | 00000110 00110011 | 0633 |
| 10 | ْ | 00000110 01010010 | 0652 |
| 11 | م | 00000110 01000101 | 0645 |
| 12 | ِ | 00000110 01010000 | 0650 |
| 13 |  | 00000000 00100000 | 0020 |
| 14 | ا | 00000110 00100111 | 0627 |
| 15 | ل | 00000110 01000100 | 0644 |
| 16 | ل | 00000110 01000100 | 0644 |
| 17 | ّ | 00000110 01010001 | 0651 |
| 18 | َ | 00000110 01001110 | 064E |
| 19 | ه | 00000110 01000111 | 0647 |
| 20 | ِ | 00000110 01010000 | 0650 |
| 21 |  | 00000000 00100000 | 0020 |
| 22 | ا | 00000110 00100111 | 0627 |
| 23 | ل | 00000110 01000100 | 0644 |
| 24 | ر | 00000110 00110001 | 0631 |
| 25 | ّ | 00000110 01010001 | 0651 |
| 26 | َ | 00000110 01001110 | 064E |
| 27 | ح | 00000110 00101101 | 062D |
| 28 | ْ | 00000110 01010010 | 0652 |
| 29 | م | 00000110 01000101 | 0645 |
| 30 | َ | 00000110 01001110 | 064E |
| 31 | ٰ | 00000110 01110000 | 0670 |
| 32 | ن | 00000110 01000110 | 0646 |
| 33 | ِ | 00000110 01010000 | 0650 |
| 34 |  | 00000000 00100000 | 0020 |
| 35 | ا | 00000110 00100111 | 0627 |
| 36 | ل | 00000110 01000100 | 0644 |
| 37 | ر | 00000110 00110001 | 0631 |
| 38 | ّ | 00000110 01010001 | 0651 |
| 39 | َ | 00000110 01001110 | 064E |
| 40 | ح | 00000110 00101101 | 062D |
| 41 | ِ | 00000110 01010000 | 0650 |
| 42 | ي | 00000110 01001010 | 064A |

| Input verse [R1] | بِسْمِ اللَّهِ الرَّحْمَٰنِ الرَّحِيمِ |
|---|---|
| Byte-stream of verse in hexadecimal [R2] | 628650633652645650206276446446516 4E6476502062764463165164E62D65264564E6 7064665020627644 63165164E62D65064A645650 |
| hash value of input verse (using MD5 hash function) [R3] | 0C0B7DFD5727C7119C363AC16F4C9775 |

FIG. 7

| Collection of hash values on page 1 (Al-fatiha:1-7) [R1] | 0C0B7DFD5727C7119C363AC16F4C9775<br>F07CC53C902DA071A3ED6008507791B6<br>8982C41A1A9B85FA3BA15EB955EDFC3E<br>F3EADB90A2592524E98A7ED89FD2FA08<br>FB3B496736346DE7E0551270DFEE5CE9<br>3360AB9F5DBC597E3362A4D98367D4E9<br>BA2659DB454D0FFB35BCA50A0D1D791C |
|---|---|
| hash value of 1st chapter or page (using MD5 hash function) [R2] | B2FB982FDBB12A5F947AA3FB1C8D3F2D |

FIG. 8

METHOD FOR AUTHENTICATING THE QURAN IN DIGITAL FORMAT AND CERTIFYING THE AUTHENTICITY OF THE DIGITAL QURAN

TECHNICAL FIELD

The present disclosure relates to a method for authenticating a digital version of the Quran, and more particularly, to a method for authenticating the Quran in a digital format and certifying the authenticity of the digital Quran.

DISCUSSION OF THE RELATED ART

With the proliferation of digital documents in recent times, numerous parties have generated a digital version of the Quran for the ease of dissemination and portability thereof. This practice enables readers to read the teachings of the Quran on their digital devices on the go and/or in other locations where carrying the Quran in a printed format may be inconvenient.

However, the process of converting the Quran to a digital format can raise concerns of tampering with the teachings of the Quran. This is because any party in the chain of digitizing and/or distributing the digital version of the Quran might be able to alter the content of the digital Quran.

Therefore, readers of digital copies of the Quran are not certain whether their copies represent the Quran in an unaltered form.

SUMMARY

The present disclosure relates to a method for verifying that a copy of the Quran's teachings, as included in a digital file submitted for authentication by a creator/distributor of the digital file, is indeed a true and unaltered copy of the Quran. The method of the present disclosure includes obtaining a digital file containing the teachings of the Quran therein. The digital file may be an application software (App) or a document (e.g., a Microsoft Word document, an Adobe PDF document, and so on) containing a digital representation of the Quran.

The contents of the digital file are inspected by a party (e.g., one or more persons) having extensive knowledge of the Quran's teachings. The party having an extensive knowledge of the Quran is trusted with determining whether the content of the obtained digital file represents the teachings of the Quran in a true and unaltered form.

When the party trusted with determining the authenticity of the digital file determines that the received file contains the Quran in its true and unaltered form, the digital file may be marked as being authentic and may be digitally signed by a second party (trusted to digitally sign true copies of the Quran in digital format). The second party may also issue a digital certificate of authenticity for the digital file and time stamp the digital file. The signature of the document, the digital certificate of authenticity thereof and/or the time stamping of the signed document can be used to quickly determine the authenticity of the document at a later time, and therefore, to verify that the content of the file is indeed a true and unaltered copy of the Quran.

When the digital file is in a document form (as contrasted to an App), the digital file may also be associated with a security feature that is based on hash values derived from the plaintext and/or images contained in the digital file.

In addition to the digital certificate of authenticity, said security feature can be used to determine the authenticity of a questioned digital file at a later time as to whether the content of the questioned file is the same as the content of the authenticated and timestamped file. For example, a hash value of a page or chapter of the Quran as included in the authentic file can be calculated and compared with a hash value of a corresponding page or chapter of the Quran in the questioned file. If the hash values match one another, the compared files have the same content (e.g., a true copy of the Quran).

Alternatively, or in addition, a checksum of a questioned file can be used to determine whether the content of the questioned file is the same as the content of the authenticated and timestamped file.

Therefore, once that a digital file of the Quran has been authenticated as being a true copy of the Quran as described in this specification, other digital files containing the teachings of the Quran therein can be quickly compared with a file authenticated in accordance with the teachings of the present disclosure to quickly determine if the other digital files are have the same content as a previously authenticated file. This process, in turn, can be used to avoid duplicative review of a digital file of the Quran by the trusted party. The reduction of duplicative review by the trusted party reduces the human effort required to produce authentic digital copies of the Quran.

BRIEF DESCRIPTION OF THE DRAWINGS

The above and other features of the present disclosure will become more apparent by describing in detail exemplary embodiments thereof in conjunction with the accompanying drawings, in which:

FIG. 6 is table illustrating a method of converting verse from the Quran in plaintext to Unicode, to a byte-stream, and to a hexadecimal format;

FIG. 7 is a table illustrating a method of calculating a hash value of the plaintext of the verse of FIG. 6;

FIG. 8 is a table illustrating a method of calculating a hash value of a concatenation of hash values of a plurality of verses;

DETAILED DESCRIPTION OF THE EMBODIMENTS

Figure 1A:
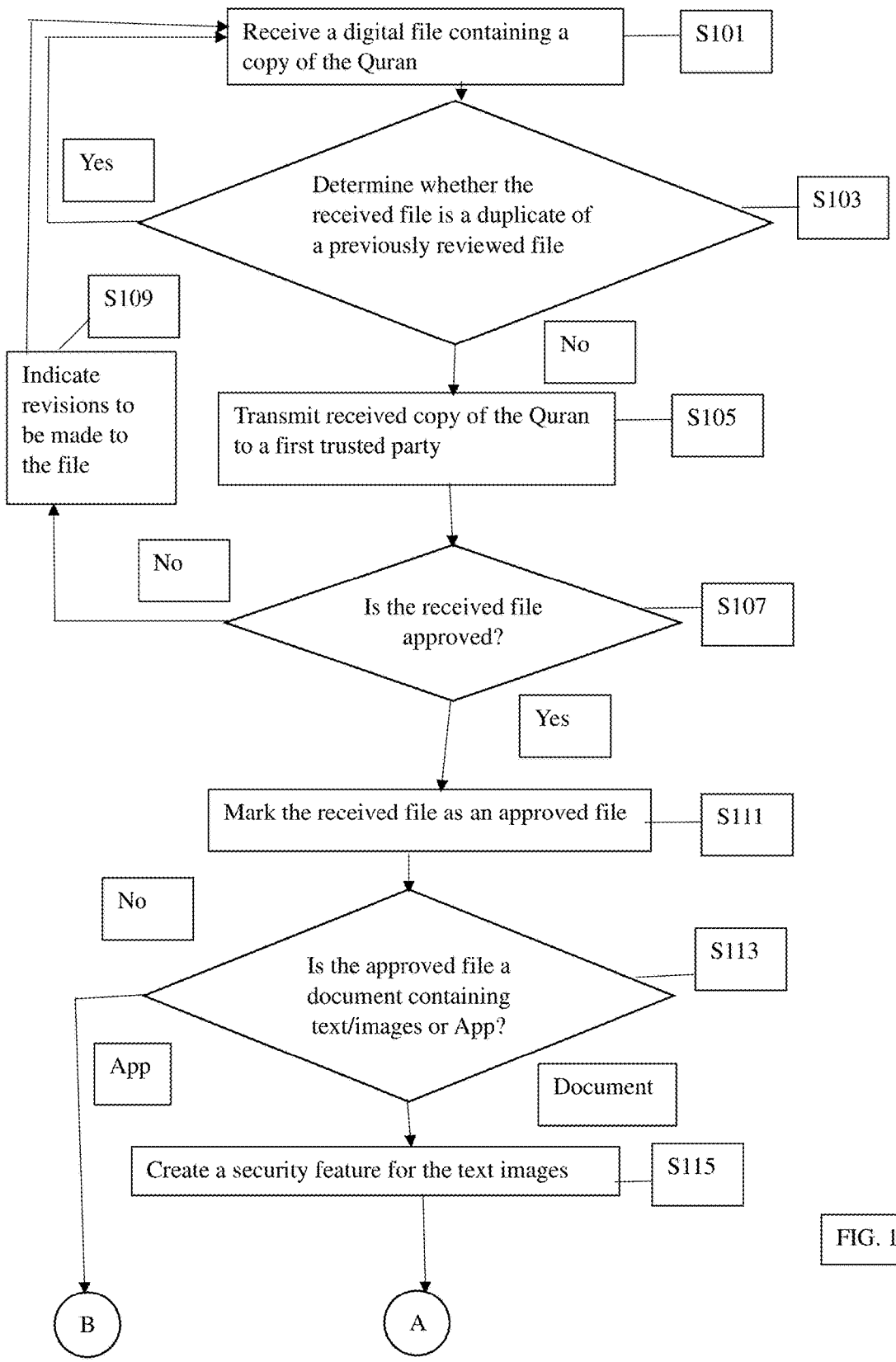
FIG. 1A is a flowchart illustrating a method for authenticating a digital copy of the Quran according to the present disclosure.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Figure 1B:
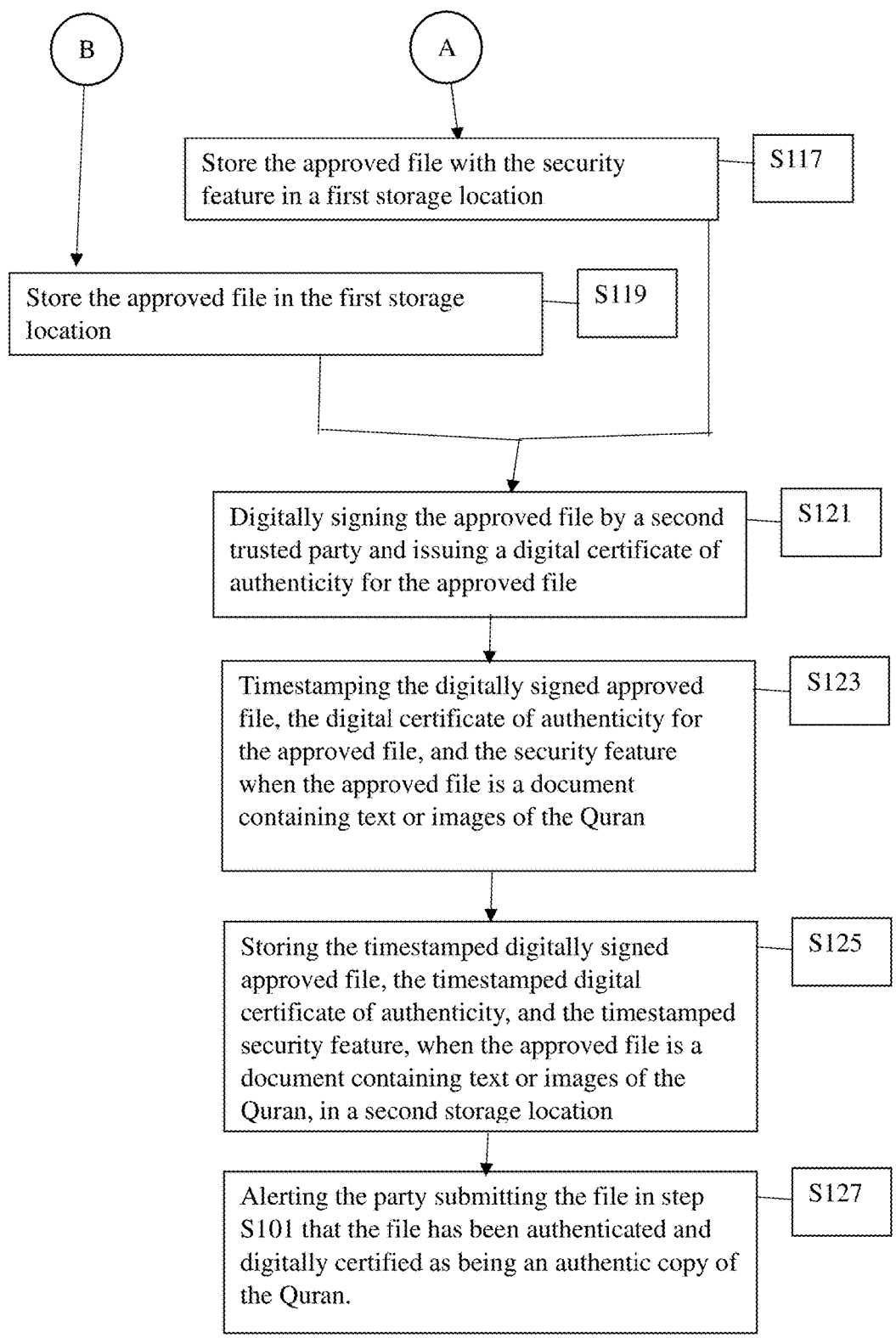
FIG. 1B is a continuation of the flowchart of FIG. 1A.

FIGS. 1A-1B illustrate a method for authenticating and certifying a digital copy of the Quran. Referring to FIG. 1A, step S101 includes receiving a digital file containing a copy of the Quran therein. The digital file may be received, for example, from a vendor wishing to authenticate the vendor's digital copy of the Quran as included in the received digital file. This way, and after the authentication of the file received in step S101 has been performed as described in this specification, the vendor can rest assured that the digital copy of the Quran that it provided in step S101, and which the vendor may wish to disseminate to others, is indeed a true and unaltered copy of the Quran.

A "vendor" is used merely as an example of an entity wishing to authenticate and/or disseminate a copy of the Quran in a digital format to others. However, the present disclosure is not limited to vendors, and other parties may also submit their digital copy of the Quran in step S101 for authentication as described in this specification. These parties may be, for example, religious individuals, religions bodies, scholars, etc. However, the term "vendor" may be used in this specification to collectively refer to all entities wishing to submit a digital copy of the Quran in step S101.

The dissemination may be performed, for example, via an application software (App) store, website(s), file transfer protocol (FTP) servers, other portals, etc., whether accessible via the internet, a local area network or other communication means.

Referring to FIG. 1A, step S103 may include determining whether the received digital file is a duplicate of a previously reviewed digital file (e.g., whether the method of the present disclosure has already been performed for the digital file received in step S101 at a previous time).

Step S103 may include calculating a checksum of the digital file received in step S101 and using the checksum to determine whether the digital file receiving in step S101 is a duplicate of a previously reviewed digital file. For example, the checksum of each file previously received in step S101 may be determined and stored in a database. Step S103 includes comparing the checksum of the file received in step S101 with the checksum of each checksum value stored in the database. When the result in step S103 is yes, the method returns to step S101.

When the result of step S103 is no, the method includes performing step S105, which includes transmitting the received digital file to a first trusted party. The first trusted party may be, for example, a Quran auditing and verification authority. The Quran auditing and verification authority may include at least one person having deep knowledge of the Quran and being trusted with the task of reviewing the digital file received in step S101, and comparing the content of the file received in step S101 with the text of an authentic copy of the Quran to determine whether the file received in step S101 includes a true and unaltered copy of the Quran.

When the first trusted party determines in step S107 that the received file does not contain an authentic copy of the Quran, step S109 may be performed to ask the vendor to make revisions to the digital file, indicated by the first trusted party, to make the vendor's digital copy of the Quran match the authentic Quran. Step S109 may also include sending an invitation to the vendor to resubmit the digital file, after it has been revised as indicated by the Quran auditing and verification authority, for reinspection (i.e., to resubmit the revised file in step S101).

When the first trusted party determines in step S107 that the copy of the Quran contained in the received digital file is an authentic copy of the Quran, step S111 is performed to mark the received digital file containing the authentic copy of the Quran as an approved file.

Step S113 is performed to determine whether the approved file is a document file (which contains text and/or images of the Quran), and not an executable file (e.g., an App). This is because a document file (e.g., a .PDF file, a .TXT file, a .DOC or .DOCX file, etc.) that includes text and/or images of the Quran therein is handled differently from an executable file in the present disclosure, as described below.

When it is determined in step S113 that the approved file is a document file containing text and/or images of the Quran, step S115 is performed to create a security feature for the text or images based on a content of the text or images. Step S115 will be described in detail below with reference to FIG. 2.

Step S117 may be performed after step S115 to store the approved file and the security feature in a first storage location. The first storage location may be, for example, a temporary storage folder of a computer/database/server, etc., accessible by a second trusted party and/or the first trusted party but not the general public.

The second trusted party may be, for example, a digital Quran certification authority. The digital Quran certification authority may include at least one individual tasked with and trusted to digitally sign the approved file of step S111 and to issue a digital certificate of authenticity for the approved file. The digital certificate of authenticity certifies that the approved file of step S111 is a true and unaltered copy of the Quran.

When the approved file is determined to be an App in step S113, step S119 may be performed to store the approved file in the first storage location. The first storage location of step S117 may be the same storage location as that of step S119. An App in this case is an executable application configured to show the Quran via a graphical interface designed by the developer of the App. The App may be configured to display the Quran, for example, in a single page book-like view, in an open book view (e.g., two consecutive pages displayed next to one another), as continuous text, etc.

Step S121 includes digitally signing the approved file of step S111 by the second trusted party and issuing a digital certificate of authenticity for the approved file by the second trusted party.

Step S123 includes timestamping the digitally signed approved file, timestamping the digital certificate of authenticity for the approved file, and timestamping the security feature when the approved file contains text or images of the Quran. These operations may be performed by the second trusted party.

The method of the present disclosure may also include performing step S125. Step S125 includes storing the timestamped and digitally signed file, storing the timestamped digital certificate of authenticity for the file, and storing the timestamped security feature, when the timestamped file is a document containing text or images of the Quran, in a second storage location. The second storage location is accessible to at least one party different than the first and second trusted parties. The second storage location may be, for example, a cloud storage location (e.g., a cloud database), a server storage location, or the like.

The second storage location is accessible, for example, to the entity/person submitting the digital file in step S101 (e.g., the vendor). Step S125 may include granting read-only access to the vendor in order to preserve the authenticity of the digitally signed and timestamped documents stored in the second storage location.

The second storage location can also be made accessible to entities/persons other than the vendor. These entities/persons may be, for example, persons/entities wishing to purchase the authenticated version of the Quran as stored in the second storage location (e.g., when the vendor wishes to sell the authenticated version of the Quran as stored in the second storage location via an App store or the like), persons/entities wishing to download the authenticated version of the Quran as stored in the second storage location free of charge (e.g., when the vendor wishes to distribute the authenticated version of the Quran as stored in the second storage location via the App store or the like free of charge), etc.

Since the vendor and/or the persons entities purchasing or obtaining a copy of the authentic version of the Quran as stored in step S125 have read-only access to the second storage location, the authenticity of the documents disseminated from the second storage location is preserved.

The method of the present disclosure may also include performing step S127. Step S125 includes alerting the vendor providing the digital file in step S101 that the vendor's digital version of the Quran has been authenticated and digitally certified as being an authentic copy of the Quran. The alert may be, for example, a text message, an email, etc., addressed to the vendor. The alert may also include instructions for the vendor to access the authenticated version of the Quran as stored in the second storage location. Therefore, the vendor can use the instructions to grant access to the authenticated version of the Quran as stored in the second storage location to others wishing to purchase or obtain said version of the Quran free of charge, as desired by the vendor.

Figure 2:
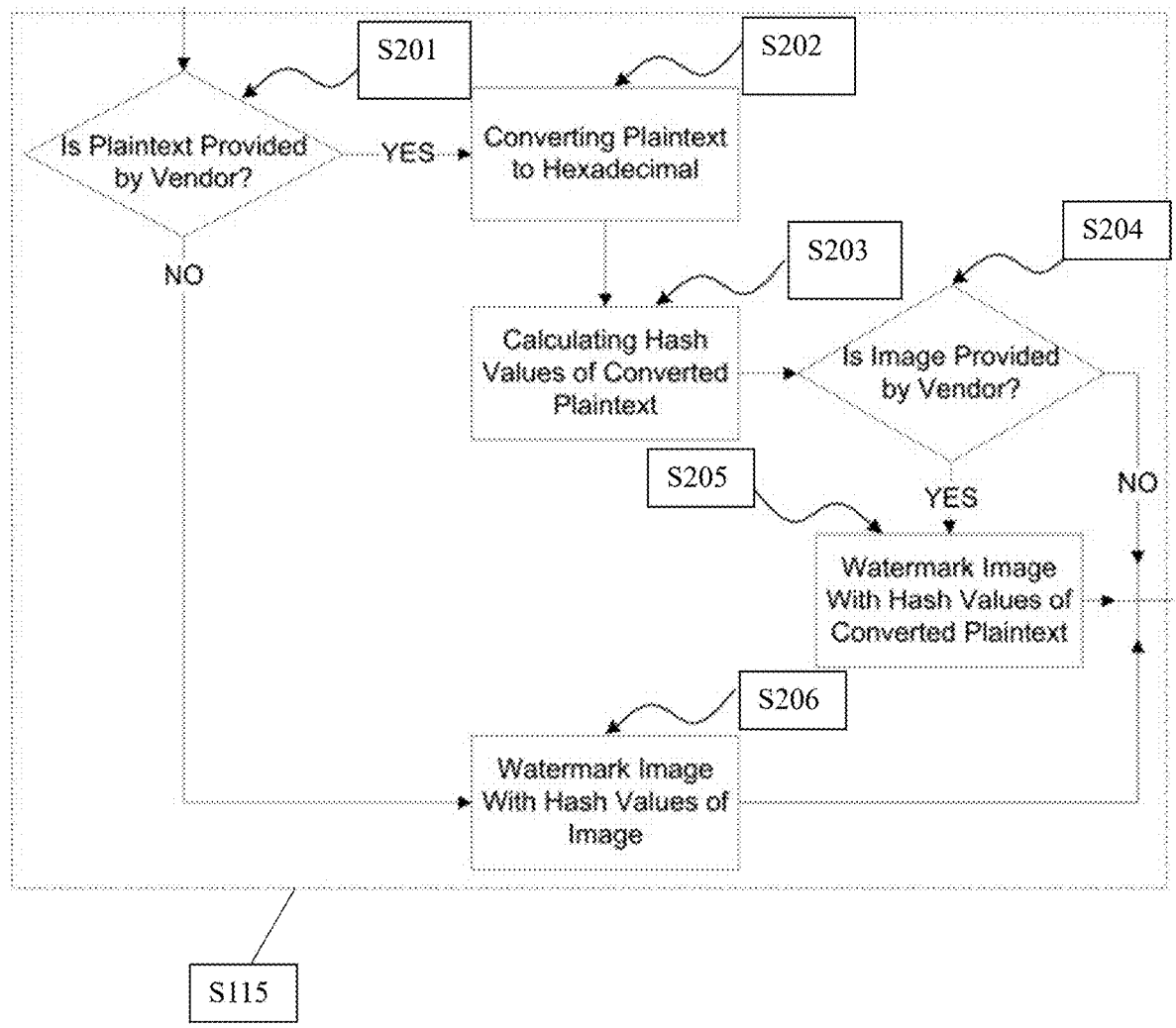
FIG. 2 is a diagram illustrating sub-steps of a first step included in the method of FIGS. 1A-1B.

FIG. 2 is a diagram illustrating in the sub-steps included in step S115 of FIG. 1. The sub-step(s) included in the method step s115 may be referred to as "step(s)" for brevity purposes. In addition, the sub-step(s) included in any other method step described in this specification may be referred to as "step(s)" for brevity purposes.

Referring to FIG. 2, step S115 may include, in sub-step S201 thereof, determining whether text (e.g., plaintext) is contained in the approved document file obtained from step S113. When the answer is yes, step S202 is performed to convert the text to a hexadecimal format (or hexadecimal number).

The process of converting the text to a hexadecimal format in step S202 is described in detail with reference to FIG. 3. The text may be referred to as plaintext for convenience purposes. Step 202 may include generating a first file containing the hexadecimal version of the plaintext included in the file of step S113.

Step S203 includes calculating hash values of the plaintext received from step S201. The process of calculating the hash values of the plaintext is described in detail with reference to FIGS. 6-8. Step 203 may include generating a second file containing the hash values of the plaintext received from step S201.

When it is determined in step S204 that one or more images of the Quran are included by the vendor in the approved file of step S113 in addition to the plaintext of the Quran, step S205 includes digitally watermarking the images provided by the vendor with the hash values of the converted plaintext. The process of watermarking the images of the Quran with the hash values of the converted plaintext is described in detail with reference to FIG. 9.

Step S205 may include generating a third file containing the watermarked images(s) included in the approved file of step S111.

The approved file of step S113 may be output to the first storage location of step S117 together with the first file of step S202, the second file of step S203 and the third file of step S205. Therefore, the approved file of step S113 and the first to third files of steps S202, S203 and S205 may be stored in the first storage location.

Referring to FIG. 2, when it is determined in step S204 that the approved file of step S113 contains no images of the Quran, the approved file of step S113 and the first to second files of steps S202 and S203 may be stored in the first storage location of step S117.

Referring to FIG. 2, when it is determined in step S201 that no plaintext of the Quran is provided by the vendor (e.g., no plaintext exists in the approved file of step S113), step S206 is performed to watermark each image of the Quran, as included in the approved file of step S113, with a hash value of its respective image. The process of watermarking each image with its hash value is described in detail with reference to FIG. 10.

Step S206 may also include generating a fourth file containing each watermarked image inside (each watermarked image as created during the performance of step S206).

When the method of FIG. 2 includes performing step S206 after step S201, the approved file of step S113 and the fourth file containing the watermarked image(s) of step S206 may be stored in the first storage location of step S117.

Figure 3:
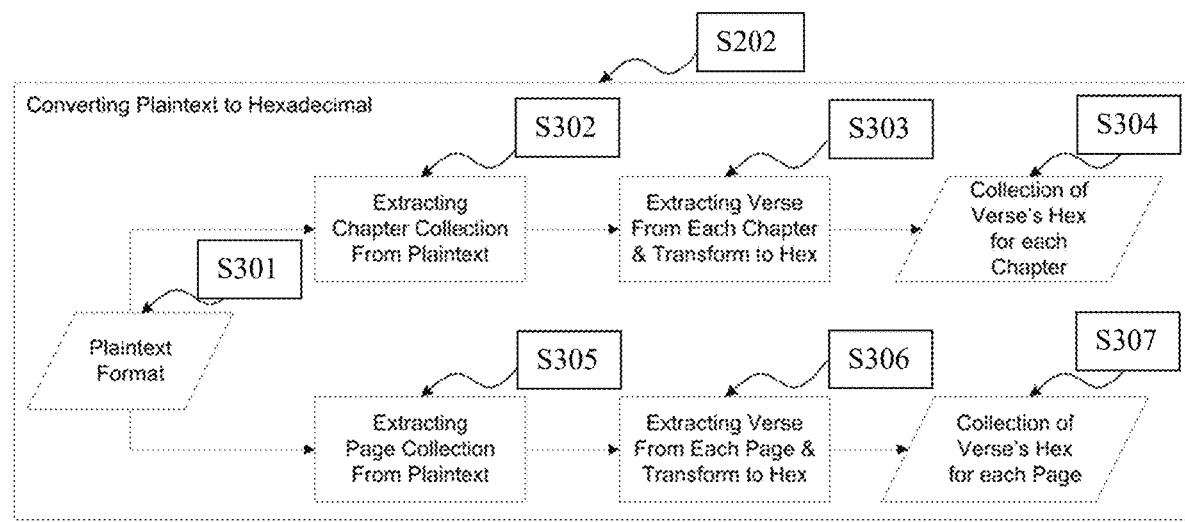
FIG. 3 is a diagram illustrating sub-steps of a first step included in the method of FIG. 2.

FIG. 3 illustrates in more detail the sub-steps of step S202.

Referring to FIG. 3, the plaintext included in the approved file of step S113, and referenced in step S301, contains a string collection of all the verses of the Quran.

Figures 4, 5:
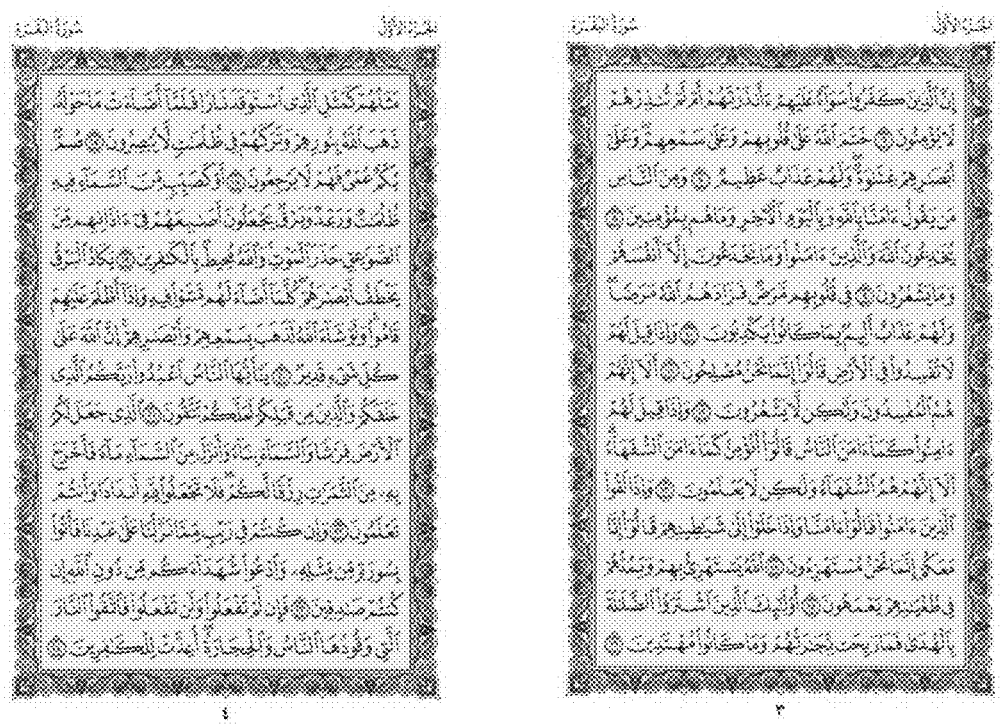
FIG. 4 is a table illustrating the first chapter of the Quran in plaintext.
FIG. 5 is an image illustrating pages 3 and 4 of the standard Quran.

FIG. 4 illustrates a portion of the string collection of the plaintext of step S301 that includes the first chapter of the Quran.

The collection of verses of the plaintext included in step S301 is sorted (or grouped) into two categories: chapter-based and page-based. The chapter-based sorting associates the verses in the string collection of step S301 with a chapter of the Quran. There are 114 chapters (surahs) in the Quran. Chapter 1 of the Quran (al-Fathia) consists of 7 verses (ayats). As indicated above, chapter 1 of the Quran is exemplarily illustrated in FIG. 4. As an example, each one of the seven verses of chapter 1 will be grouped as belonging to (or being associated with) chapter 1 of the Quran.

The page-based sorting associates the verses in the string collection of step S301 by the page. For example, page three of the standard Quran consists of eleven verses. Unlike the number of chapters in the Quran (which is fixed at 114), the number of pages in the approved file of step S113 varies depending on how the vendor sizes and formats the pages of the approved file. Therefore, each file received in step S101 of FIG. 1 can have different page numbers. However, each file marked as approved in step S111 of FIG. 1 will have 114 chapters.

Referring now to step S302 of FIG. 3, chapter information is extracted from the string collection of step S301. Step S302 associates each verse of the Quran, as contained in the string collection of step S301, with the number of the page in which the verse appears in the approved file of step S111.

To more clearly depict the method of the present disclosure, reference will be made to FIG. 4. FIG. 4 illustrates the sorting of the verses of the first chapter of the Quran as an example. The first chapter of the Quran (illustrated in FIG. 4) contains seven verses.

Referring to FIG. 4, a table that includes four columns (i.e., columns C1, C2, C3 and C4) and seven rows is generated. Each verse of the Quran, as contained in the string collection of step S301, is presented in a separate row of column C4. The verse presented in each row of column C4 is extracted from the string collection of step S301. In addition, the verse presented in each row of column C4 may be a whole verse of the Quran.

FIG. 4 exemplarily illustrates each verse, from among the seven verses of chapter 1 of the Quran, in a separate row. Therefore, the table of FIG. 4 includes seven rows. The row that depicts the column indicator numbers C1, C2, C3 and C4 is provided for visual purposes to indicate to a human reader that the plaintext included in the approved file of step S111 is sorted in four columns (i.e., columns C1-C4), but said informational row of the table is not used for calculating any hash values as described in this specification and does not count as a row for any other algorithm taught by this specification.

Column C3 includes the information that results when performing step S305. In each row of the table, column C3 indicates the number of the page, from among the plurality of pages of the approved file of step S111, in which the verse displayed on column C4 appears. As exemplarily illustrated in FIG. 4, each entry of column C3 is "1", indicating that each one of the seven verses of chapter 1 is displayed on (or appears in) page 1 of the approved file of step S111.

In each row of the table, column C1 displays the chapter number of the Quran associated with the verse presented in column C4. As indicated in FIG. 4, each entry of column C1 is "1", indicating that each one of the seven verses depicted in FIG. 4 is a verse found in chapter 1 of the Quran.

In each row of the table, column C2 displays the verse number in the corresponding chapter of the Quran. As illustrated in FIG. 4, the entries of column C2 are 1 to 7, presented sequentially. This information indicates that the verse depicted in the first row of the table is the first verse of chapter 1, the verse depicted in the second row of the table is the second verse of chapter 1, and so on. In other words, columns C1 to C3 of FIG. 4 indicate that FIG. 4 displays the entire chapter 1 of the Quran in plaintext form with the seven verses thereof arranged in a consecutive order from top to bottom in separate rows.

The present disclosure may include tabulating the entire version of the Quran, as included in the approved file of step S111 (and in the plaintext format of step S301), in a table of four columns, as indicated in this specification for chapter 1 of the Quran. Said table may be referred to as the "complete table" in this specification.

Therefore, and when forming the complete table, each verse of the Quran, as contained in the string collection of step S301, may be allocated to a different row of column C4 of the complete table along with its chapter identifying information, verse number information within the identified chapter, and page information in columns C1 to C3, as indicated in this specification for chapter one of the Quran.

The present disclosure includes extracting the verses from plaintext format of step S301. Each individual verse may be allocated to a separate row of column C4 of the complete table.

Step S302 includes extracting the chapter number, ranging from 1 to 114, from the string collection of step S301 for each verse of the Quran. The extracted chapter number is displayed in column C1 of the complete table for the respective verse displayed in column C4.

Step S302 may also include transforming the verses of each chapter into a hexadecimal format. Step S302 will be described in more detail below.

Step S304 includes collecting the verses' hexadecimal numbers for each chapter of the Quran. Step S304 will be described in more detail below.

Step S305 includes extracting page number information from the string collection of step S301. The extracted page number information may be included in column C3 of the complete table for each corresponding verse illustrated in column C4. This information indicates the page number, from among the plurality of pages of the approved file of step S111, in which the verse displayed in column C4 appears.

In each row of the complete table, column C2 indicates the verse number in the corresponding chapter of the Quran for the verse illustrated in column C4.

Step S306 includes extracting verses from each page of the approved file of step S111 and transforming the verses to a hexadecimal format. Step S306 will be described in more detail below.

Step S307 includes collecting the verses' hexadecimal numbers for each page. Step S307 will be described in more detail below.

Steps S303, S304, S306 and S307 will be described below with reference to FIGS. 6-8.

FIG. 6 depicts a method of processing a single verse from plaintext of step S301 to form a byte stream, and processing the byte stream to form a hexadecimal number (or hexadecimal format).

Particularly, FIG. 6 depicts the process of converting the plaintext of step S301 into a hexadecimal number for the first verse of the first chapter (al-Fathia) of the Quran. Referring to FIG. 6, the first verse of the first chapter of the Quran, obtainable from the complete table as described in this specification (and corresponding to the first row of the table of FIG. 4), is displayed as row 601 in FIG. 6.

The first three numbers "1" in row 601 respectively indicate the chapter number, verse number in the corresponding chapter and the page number in which the verse of row 601 is displayed in the approved file of step S113 (when read from left to right). Stated otherwise, and reading from the left side of row 601, the first (or leftmost) number "1" corresponds to the number entered in column C1 of the complete table, and indicates that the text of row 601 is found in chapter 1 of the Quran. The next number "1" (or middle "1") corresponds to the number entered in column C2 of the complete table, and indicates that the text of row 601 is the first verse of chapter 1. The next number "1" (rightmost "1") corresponds to the number entered in column C3 of the complete table, and indicates that the text of row 601 is found on page 1 of the Quran in the approved file of step S113. The text subsequent to the rightmost "I" character in row 601 is the first verse of the first chapter of the Quran (extracted from the plaintext of step S301 of the approved file of step S113) in plaintext format (and found in column C4 of the complete table).

Reading the first verse of chapter al-Fathia character-by-character (as shown in row 601) would return a total 42 characters, including the spaces, as shown in table 603 of FIG. 6. Column "Unicode" in table 603 represents a character that is interpreted from the current verse (i.e., the verse of row 601 in this example) in Unicode. The verse begins with character #7. Character #7 represents only the base character without the harakat (short vowel marks). The harakat is defined in the next character, character #8. Thus, character numbers #7 and #8 are correlated.

Each character of the verse of row 601 is defined by two bytes or 16 bits (1 byte=8 bits) in the binary numeral system. The binary number of each Unicode character shown in the table 603 is displayed in the "Binary" column of table 603, producing a byte stream. The byte stream of each Unicode character is transformed into a hexadecimal numeral system, displayed in the column "Hexadecimal" of table 603. The hexadecimal number of each character of row 601, as displayed in the "Hexadecimal" column of table 603, is utilized to calculate the hash value for the verse of row 601. This process is applied to whole verses of the entire Quran as contained in the approved file of step S113.

The obtained hexadecimal numbers of the verses for each chapter (step S303) may be grouped (or concatenated) together (step S304), resulting in a chapter-based collection of hexadecimal numbers. In addition, the obtained hexadecimal numbers of the verses for each page (step S306) may be grouped (or collected) together (step S307), resulting in a chapter-based collection of hexadecimal numbers.

Step S203, calculating the hash values of the hexadecimal text (step S203), will be described with reference to FIGS. 7 and 8. The sub-steps of step S203 described below can be performed for each chapter of the Quran and each page of the Quran, as included in the approved file of step S111.

FIG. 7 illustrates an exemplary process of calculating a hash value from the verse of row 601. Row R1 of the table of FIG. 7 illustrates the verse of row 601.

Referring to FIG. 7, the hexadecimal values (or numbers) illustrated in table 603 of FIG. 6 are gathered together in a consecutive order and without spaced in between (e.g., the hex numbers of table 603 are concatenated with one another) to form the byte stream of row R2 of FIG. 7. Stated otherwise, the hexadecimal numbers of each whole verse may be concatenated to one another to o form a verse hexadecimal stream of numbers for each whole extracted verse of the Quran.

The concatenation process may begin with character #7 of table 603 (i.e., 0628) because that is the first character of the verse. The hexadecimal numbers of character #1 to character #6 are ignored. This is because characters #1 to #6 display the chapter, verse and page numbers of columns C1 to C3, with character "I" separating said numbers from one another.

As illustrated in row R2 of FIG. 7, the initial "0" of each hexadecimal number in the "Hexadecimal" column of FIG. 6 may be omitted from the concatenation (i.e., the hexadecimal number of character #7 is "628", the hexadecimal number of character #8 is "650" and so on). Step S203, calculating the hash value of the plaintext contained in the approved file of step S111, will be described with reference to FIGS. 7 and 8.

As an example, the verse hexadecimal stream of numbers for the first whole extracted verse of the Quran is illustrated in row R2 of the table of FIG. 7.

Step S203 includes calculating the hash value of the converted plaintext. For example, step S203 includes calculating a hash value of each verse hexadecimal stream of numbers for each whole extracted verse of the Quran to produce a plurality of verse hash numbers. Row R3 of the table of FIG. 7 exemplarily illustrates the verse hash number as calculated by using a hash function that takes the verse hexadecimal stream of numbers for the first verse of chapter one as input.

The verse hexadecimal stream of numbers is referred to as the "byte-stream of verse in hexadecimal" in row R2 of FIG. 7. The verse hexadecimal stream of numbers in row R2 of the table of FIG. 7 can be fed into different hash functions to produce a hash value of the corresponding verse (i.e., to produce the verse hash number). Hash functions that can be used in the present disclosure include MD5, SHA-1, SHA-256, or any other hash function desired by a user. The MD5 hash function is used as an example in the calculations of FIG. 7.

Specifically, row R3 of FIG. 7 displays the verse hash number of the first verse of chapter one as calculated by using the MD5 hash function. The MD5 hash function takes as input the verse hexadecimal stream of numbers of row R2, and based on said input, outputs to row R3 of FIG. 7 a verse hash number with a length of 32 characters in the hexadecimal numeral system. The process of FIG. 7 is applied to whole verses of the entire Quran to produce a plurality of verse hash numbers.

FIG. 8 is a table illustrating the process of calculating the hash value of a chapter of the Quran. In the case of page 1, which includes the entire first chapter of the Quran as exemplarily illustrated in FIG. 4, FIG. 8 also illustrates the process of calculating the hash value of a page of the Quran.

Referring to FIG. 8, (and with respect to the chapter-based approach), step S203 includes collecting verse hash numbers of a same chapter of the Quran, from among the plurality of verse hash numbers of the Quran, to produce a collection of verse hash numbers for each chapter of the Quran.

Row R1 of the table of FIG. 8 exemplarily illustrates the collection of verse hash numbers that results from collecting the verse hash numbers of chapter one of the Quran together. For example, and with reference to row R1 of the table of FIG. 8, the first hash value "0C0B . . . " is the hash value of the first verse of chapter 1, the second hash value "F07C . . . " is the hash value of the second verse of chapter 1, and so on for all seven verses of chapter 1.

Step S203 includes calculating a hash value of each collection of verse hash values for each chapter of the Quran to produce a plurality of chapter-based hash values. For example, the chapter-based hash value of chapter one, calculated by taking the collection of hash values of chapter one (as illustrated in row R1 of FIG. 8) can be fed as an input to a desired hash function. In the example of FIG. 8, the collection of hash values of chapter one is input to an MD5 hash function, and the MD5 hash function outputs the chapter-based hash value for chapter one in row R2 of FIG. 8. This process is repeated for all 114 chapters of the Quran to produce 114 chapter-based hash values. Other hash functions may be utilized instead of the MD5 hash.

Step S203 includes concatenating the 114 chapter-based hash values to produce a single (or concatenated) hash input value, and calculating a single hash value of the entire Quran based on the single hash input value. For example, the single hash input value may be input to a desired hash function, and the hash function may produce the single hash value of the entire Quran, in a chapter-based approach, based on the single hash input value.

The process of FIG. 8 can also be produced for each page of the Quran as included in the approved file of step S111. Therefore, when step S203 is performed in the page-based approach, the difference is that row R1 of FIG. 8 would contain a collection of hash values of verse of the same-page of the Quran.

In more detail, in the page-based approach, step S203 includes collecting verse hash numbers of a same page of the Quran, from among the plurality of pages of the Quran as included in the approved file of step S111, to produce a collection of verse hash numbers for each page of the Quran.

In the page-based approach, the number of collections of the verse hash numbers depends on the number of pages of the Quran as included in the approved file of step S111. For example, 604 collections of verse hash numbers may be generated for the standard Quran as issued by King Fahad Quran and Printing Complex (KFQPC) due to the 604 pages contained in said standard Quran.

In the page-based approach, step S203 includes calculating a hash value of each collection of verse hash numbers for each page of the Quran to produce a plurality of page-based hash values. An MD5 hash function or any other desired function may be used to produce the plurality of page-based hash values. For example, the standard Quran as issued by the KFQPC may result in the production of 604 page-based hash values.

In the page-base approach, step S203 may include concatenating the plurality of page-based hash values to produce a single page-based hash input value. For example, the concatenation 604 page-based hash values of the standard Quran as issued by the KFQPC would result in a single (and long) page-based hash input value.

In the page-based approach, step S203 may include calculating a single hash value of the entire Quran based on the single page-based hash input value. For example, the single page-based hash input value may be fed as input to a desired hash function to produce (or calculate) a single hash value for the entire Quran.

The type of hash function used to determine each hash value as described in this specification may be recorded in a database for record-keeping purposes (e.g., in the second file). For example, when there is a question as to whether a fifth file containing a digital version of the Quran inside, and being different from the approved file of step S111, has a same content as the approved file, the information regarding the hash functions used for the approved file of step S111 can be used to determine a hash value of plaintext of the entire Quran as included in the fifth file (based on the teachings of this specification). Then, the hash value of the entire Quran of the fifth file can be compared with the hash value of the entire Quran of the approved file in step S111 to determine whether the fifth file has the same content as the approved file. This verification process can be used to do away with manual (e.g., human-based) verification of the entire text of the fifth file. The verification process performed by comparing the hash value of the fifth file with the hash value of the approved file can be conducted in addition to or instead of verifying the second file by its checksum value and reviewing the certificate of authenticity of the fifth file (when the fifth file has a certificate of authenticity issued by the second trusted party as described in this specification).

Figure 9:
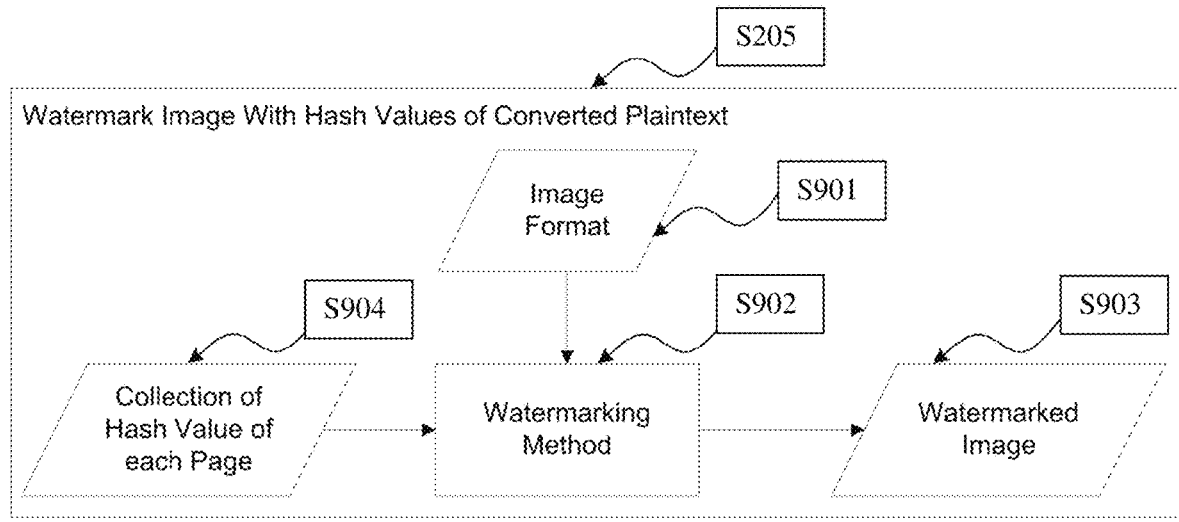
FIG. 9 is a diagram illustrating sub-steps of a second step included in the method of FIG. 2.

FIG. 9 is a diagram illustrating the sub-steps included in step S205 of the method of FIG. 2, describing the process of watermarking images of the Quran with the hash values of the converted plaintext. The watermarking process of FIG. 9 is performed when the approved file of step S111 includes plaintext and images of the Quran.

Referring to FIG. 9, sub-step S901 of step S205 includes obtaining the images of the Quran as included in the approved file of step S111. The collection of hash values for each page of the Quran, as described in this specification, is the input of the watermarking method of step S205.

Step S902 includes utilizing a digital watermarking method to watermark each image (of a page of the Quran) with, for example, the hash value of the plaintext of the corresponding page (step S904 as described in this specification), to produce a plurality of watermarked images of the Quran (Step S903).

FIG. 5 illustrates two exemplary images of the standard Quran (images of pages 3 and 4) that can be watermarked as described in this specification.

Specifically, the hash value of the plaintext of a particular page of the Quran, as included in the approved file of step S111 (and obtained in step S904), is input into a digital watermarking method of step S902 to watermark the image of the same page of the Quran (step S903). This process can be performed for each page of the Quran to result in a plurality of watermarked pages of the Quran (step S903).

Any digital watermarking method can be used to perform step S902. For example, one of the recent steganography methods proposed by Hetzl and Mutzel (2005) can be utilized for watermarking each page image of the Quran with the page's plaintext hash value.

The digital watermark can be used to independently verify the authenticity of each image in the approved file of step S111. This is because each hash value determined as described in this specification for each page of the Quran can be recorded in a database for record-keeping purposes. In addition, the hash function(s) used for producing the hash values can be recorded in the database (e.g., in the second file). Therefore, a tamper on a single bit and/or pixel of a watermarked image produced by step S903 will destroy the embedded hash value data in said image (i.e., the watermarked hash value in the tampered image file would be different from the hash value of the plaintext associated with said image as recorded in the database). The mismatch between the hash value that an image of the Quran should have revealed (i.e., the hash of the plaintext of said page) and the hash value that it actual reveals due to being tampered with indicates that the tampered image of the Quran is not the same image as that approved in step S111 (and therefore, no longer authentic based on the verification/authentication method described in this specification).

The hash values of the pages of the Quran (chapter-based and/or page-based), the plaintext of the Quran as included in the approved file of step S111 and the plurality of watermarked images produced by step S903 can be stored in the first storage location. The second trusted party can access these documents from the first storage location to digitally sign and issue a certificate of authenticity for the same.

Figure 10:
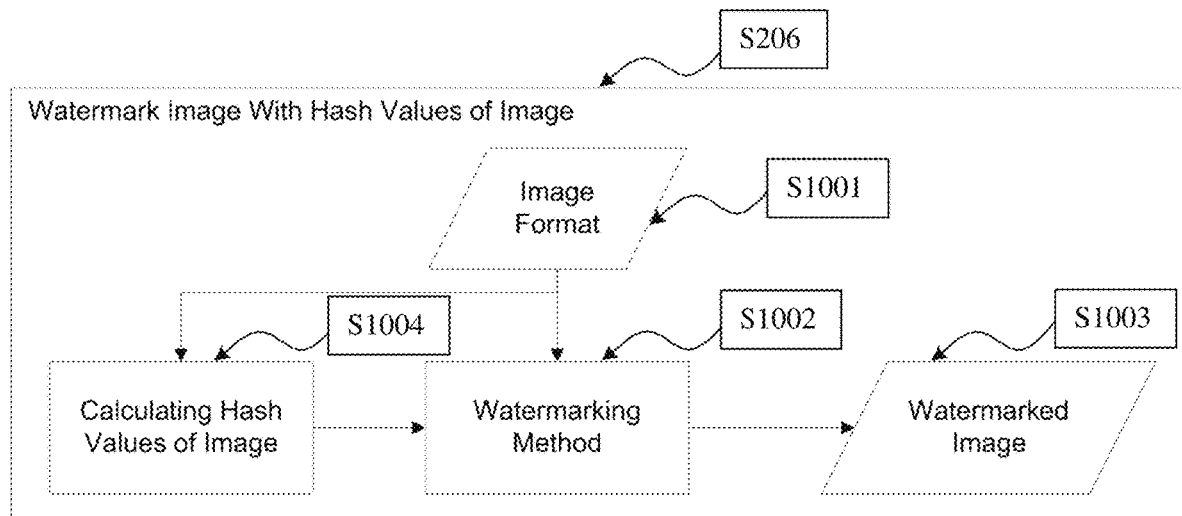
FIG. 10 is a diagram illustrating sub-steps of a third step included in the method of FIG. 2.

FIG. 10 is a diagram illustrating the sub-steps included in step S206 of the method of FIG. 2, describing the process of watermarking images of the Quran with the hash values of the images themselves. The process of step S206 is performed when the approved file of step S111 includes images of the Quran without the Quran's plaintext (and the approved file is in a document format, e.g., a PDF file containing images of the Quran's pages, as opposed to an App).

Referring to FIG. 10, sub-step S1001 of step S206 includes obtaining the images of the pages of the Quran from the approved file of step S111. Step S1004 includes calculating a hash value for each image of the Quran as included in the approved file of step S111. Step S1004 includes feeding whole bytes of each image included in the approved file to produce a hash value for each image of the Quran. A known hash function can be used to perform step S1004.

Step S1002 includes watermarking each image of the approved file of step S111 with its corresponding hash value as determined by performing step S1004. The output of the watermarking process of step S1002 is a watermarked image of step S1003. Since steps S1001-S1004 may be performed for each image of the Quran, step S206 may result in a plurality of watermarked images that in combination illustrate the entire Quran.

Each hash value calculated in step S1004, the type of hash function used to calculate the hash values of step S1004 and the type of watermarking method used to watermark the images of the Quran in step S1002 along with their respective hashes may be recorded (or stored) for record-keeping purposes. This information can be used to determine at a later time whether an image of the Quran as included in a questioned document is an image of the Quran as authenticated by the teachings of this specification. When the watermark obtained from the questioned document is not the same as the watermark corresponding to that page as determined in step S1004 (which can be stored in a database for the comparison process at a later time), the questioned document is either a modified image of an image of the Quran as authenticated by using the method of the present disclosure (and therefore, no longer authentic), or is a different file altogether (and therefore, unauthenticated).

The hash values of the pages of the Quran (image-based, step S1004), the plaintext of the Quran as included in the approved file of step S111 and the plurality of watermarked images produced by step S1003 can be stored in the first storage location. The second trusted party can access these documents from the first storage location to digitally sign and issue a certificate of authenticity for the same.

When in step S113 of the method of FIG. 1 is determined that the approved file of step S111 is an App configured to display the Quran, the App can be stored in the first storage location.

Figure 11:
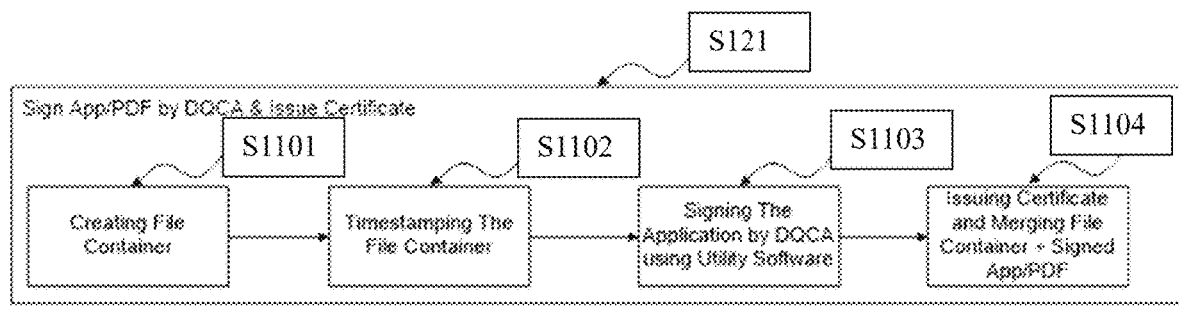
FIG. 11 is a diagram illustrating sub-steps of a second step included in the method of FIGS. 1A-1B.

FIG. 11 is a diagram illustrating the steps taken to digitally sign the approved file of step S111. The sub-steps of FIG. 11 apply whether the approved file of step S111 is an App or a document containing plaintext and/or images of the Quran. The sub-steps of FIG. 11 may be performed by the second trusted party.

Referring to FIG. 11, step S1101 includes combining all of the documents received from steps S117 and/or S119 into a file container. Step S1102 then includes time-stamping the file container to protect the file container from any tampering action in the future.

Step S1103 may include receiving the approved file of step S111 from the file container in a document format on in an App format, and signing the approved document or App by the second trusted party. The second trusted party may use a known software configured to digitally sign documents for signing the approved file of step S111.

Step S1104 may then be performed to issue a digital certificate for the approved file of step S111 and merge the file container along with the signed document or App of step S111 in the first storage location.

As indicated above, step S125 includes storing the time-stamped digitally signed approved file of step S111 (whether in an App or document form), the timestamped digital certificate of authenticity, and any other timestamped file included in the file container, in a second storage location. The vendor may be provided with read-only access to the second storage location to review the approved and authenticated version of the Quran as included in the file of step S111 for review and/or dissemination to others.

Step S127 includes alerting the vendor that the vendor's file has been authenticated and a digitally certified copy thereof has been placed in the second storage location for access by the vendor and/or others.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A method for authenticating a digital version of the Quran, comprising:
    receiving a digital file containing a copy of the Quran therein;
    transmitting the received digital file to a first trusted party;
    reviewing, by the first trusted party, the copy of the Quran contained in the received digital file;
    determining, by the first trusted party, that the copy of the Quran contained in the received digital file is an authentic copy of the Quran;
    marking the received digital file containing the authentic copy of the Quran as an approved file;
    wherein,
    when the approved file is a document file containing text or images of the Quran, creating a security feature for the text or images based on a content of the text or images; and
    storing the approved file and the security feature in a first storage location; or
    when the approved file is an application software (App), storing the approved file in the first storage location;
    digitally signing the approved file by a second trusted party and issuing a digital certificate of authenticity for the approved file; and
    timestamping the digitally signed approved file, the digital certificate of authenticity for the approved file, and the security feature when the approved file contains text or images of the Quran,
    wherein, when the approved file is a document file containing text or images of the Quran, the step of creating a security feature for the text or images based on a content of the text or images includes:
    determining that the approved file includes plaintext of the Quran;
    converting the plaintext of the Quran to a hexadecimal format; and
    calculating a hash value of the converted plaintext, and
    wherein the step of converting the plaintext of the Quran to a hexadecimal format includes:
    extracting whole verses of the Quran from the approved file;
    determining a hexadecimal number of each character in each whole extracted verse; and
    concatenating the determined hexadecimal numbers to form a verse hexadecimal stream of numbers for each whole extracted verse,
    wherein the step of calculating the hash value of the converted plaintext includes:
    calculating a hash value of each verse hexadecimal stream of numbers for each whole extracted verse of the Quran to produce a plurality of verse hash numbers;
    collecting verse hash numbers of a same chapter of the Quran, from among the plurality of verse hash numbers, to produce a collection of verse hash numbers for each chapter of the Quran;
    calculating a hash value of each collection of verse hash values for each chapter of the Quran to produce a plurality of chapter-based hash values;
    concatenating the plurality of chapter-based hash values to produce a single chapter-based hash input value; and
    calculating a single hash value of the entire Quran based on the single chapter-based hash input value.

2. The method of claim 1, wherein, when there is a question as to whether a fifth file, different from the approved file, has a same content as the approved file, the method further comprises:
    determining a hash value of plaintext of the entire Quran as included in the fifth file; and
    comparing the hash value of the entire Quran of the fifth file with the hash value of the entire Quran of the approved file to determine whether the fifth file has the same content as the approved file.

3. The method of claim 1, wherein the step of converting the plaintext of the Quran to a hexadecimal format includes:
    extracting whole verses of the Quran from the approved file;
    determining a hexadecimal number of each character in each whole extracted verse;
    concatenating the determined hexadecimal numbers to form a verse hexadecimal stream of numbers for each whole extracted verse; and
    wherein the step of calculating the hash value of the converted plaintext includes:
    calculating a hash value of each verse hexadecimal stream of numbers for each whole extracted verse of the Quran to produce a plurality of verse hash numbers;
    collecting verse hash numbers of a same page of the Quran, from among the plurality of pages of the Quran as included in the approved file, to produce a collection of verse hash numbers for each page of the Quran;
    calculating a hash value of each collection of verse hash numbers for each page of the Quran to produce a plurality of page-based hash values;
    concatenating the plurality of page-based hash values to produce a single page-based hash input value; and
    calculating a single hash value of the entire Quran based on the single page-based hash input value.

4. The method of claim 1, wherein the step of creating a security feature for the text or images based on a content of the text or images further comprises determining that a first image of the Quran is included in the approved file in addition to the text of the Quran; and
    watermarking the first image with the hash value of the converted plaintext.

5. The method of claim 1, wherein, when the approved file is a document file containing text or images of the Quran, the step of creating a security feature for the text or images based on a content of the text or images includes:
    determining that the approved file includes a first image of the Quran but no plaintext of the Quran; and
    watermarking the first image with a hash value of said first image.

6. The method of claim 5, further comprising a step of utilizing the hash value of said first image in the watermarked first image to determine whether said first image is authentic.

7. The method of claim 3, wherein, when the approved file is a document file containing text and images of the Quran, the step of creating a security feature for the text or images based on a content of the text or images includes:
    associating each image of the Quran with a page-based hash value, from among the plurality of page-based hash values, corresponding to a page of the Quran that each image illustrates; and
    watermarking each image of the Quran with its associated page-based hash value.

8. The method of claim 1, further comprising a step of storing the timestamped digitally signed approved file, the timestamped digital certificate of authenticity, and the timestamped security feature, when the approved file contains text or images of the Quran, in a second storage location, said second storage location being accessible to at least one party different than the first and second trusted parties.

9. The method of claim 1, further comprising a step of calculating a checksum of the received digital file, and
using the calculated checksum to determine whether the received digital file is a duplicate of a previously reviewed digital file.

10. The method of claim 1, wherein the first trusted party is a Quran auditing and verification authority.

11. The method of claim 1, wherein the second trusted party is a digital Quran certification authority.

12. A method for authenticating a digital version of the Quran, comprising:
receiving a digital file containing a copy of the Quran therein;
transmitting the received digital file to a first trusted party;
reviewing, by the first trusted party, the copy of the Quran contained in the received digital file;
determining, by the first trusted party, that the copy of the Quran contained in the received digital file is an authentic copy of the Quran;
marking the received digital file containing the authentic copy of the Quran as an approved file;
wherein,
when the approved file is a document file containing text or images of the Quran, creating a security feature for the text or images based on a content of the text or images; and
storing the approved file and the security feature in a first storage location; or
when the approved file is an application software (App), storing the approved file in the first storage location;
digitally signing the approved file by a second trusted party and issuing a digital certificate of authenticity for the approved file; and
timestamping the digitally signed approved file, the digital certificate of authenticity for the approved file, and the security feature when the approved file contains text or images of the Quran,
wherein, when the approved file is a document file containing text or images of the Quran, the step of creating a security feature for the text or images based on a content of the text or images includes:
determining that the approved file includes plaintext of the Quran;
converting the plaintext of the Quran to a hexadecimal format; and
calculating a hash value of the converted plaintext,
wherein the step of creating a security feature for the text or images based on a content of the text or images further comprises:
determining that a first image of the Quran is included in the approved file in addition to the text of the Quran; and
watermarking the first image with the hash value of the converted plaintext.

13. A method for authenticating a digital version of the Quran, comprising:
receiving a digital file containing a copy of the Quran therein;
transmitting the received digital file to a first trusted party;
reviewing, by the first trusted party, the copy of the Quran contained in the received digital file;
determining, by the first trusted party, that the copy of the Quran contained in the received digital file is an authentic copy of the Quran;
marking the received digital file containing the authentic copy of the Quran as an approved file;
wherein,
when the approved file is a document file containing text or images of the Quran, creating a security feature for the text or images based on a content of the text or images; and
storing the approved file and the security feature in a first storage location; or
when the approved file is an application software (App), storing the approved file in the first storage location;
digitally signing the approved file by a second trusted party and issuing a digital certificate of authenticity for the approved file; and
timestamping the digitally signed approved file, the digital certificate of authenticity for the approved file, and the security feature when the approved file contains text or images of the Quran,
wherein, when the approved file is a document file containing text or images of the Quran, the step of creating a security feature for the text or images based on a content of the text or images includes:
determining that the approved file includes plaintext of the Quran;
converting the plaintext of the Quran to a hexadecimal format; and
calculating a hash value of the converted plaintext,
wherein the step of converting the plaintext of the Quran to a hexadecimal format includes:
extracting whole verses of the Quran from the approved file;
determining a hexadecimal number of each character in each whole extracted verse; and
concatenating the determined hexadecimal numbers to form a verse hexadecimal stream of numbers for each whole extracted verse;
wherein the step of calculating the hash value of the converted plaintext includes:
calculating a hash value of each verse hexadecimal stream of numbers for each whole extracted verse of the Quran to produce a plurality of verse hash numbers;
collecting verse hash numbers of a same page of the Quran, from among the plurality of pages of the Quran as included in the approved file, to produce a collection of verse hash numbers for each page of the Quran;
calculating a hash value of each collection of verse hash numbers for each page of the Quran to produce a plurality of page-based hash values;
concatenating the plurality of page-based hash values to produce a single page-based hash input value; and
calculating a single hash value of the entire Quran based on the single page-based hash input value,
wherein, when the approved file is a document file containing text and images of the Quran, the step of creating a security feature for the text or images based on a content of the text or images includes:
associating each image of the Quran with a page-based hash value, from among the plurality of page-based hash values, corresponding to a page of the Quran that each image illustrates; and
watermarking each image of the Quran with its associated page-based hash value.

* * * * *